D. J. HAPPERSETT.
Car Truck.
No. 58,816.　　　　　　　*Fig. 1.*　　　　　　　Patented Oct. 16, 1866.
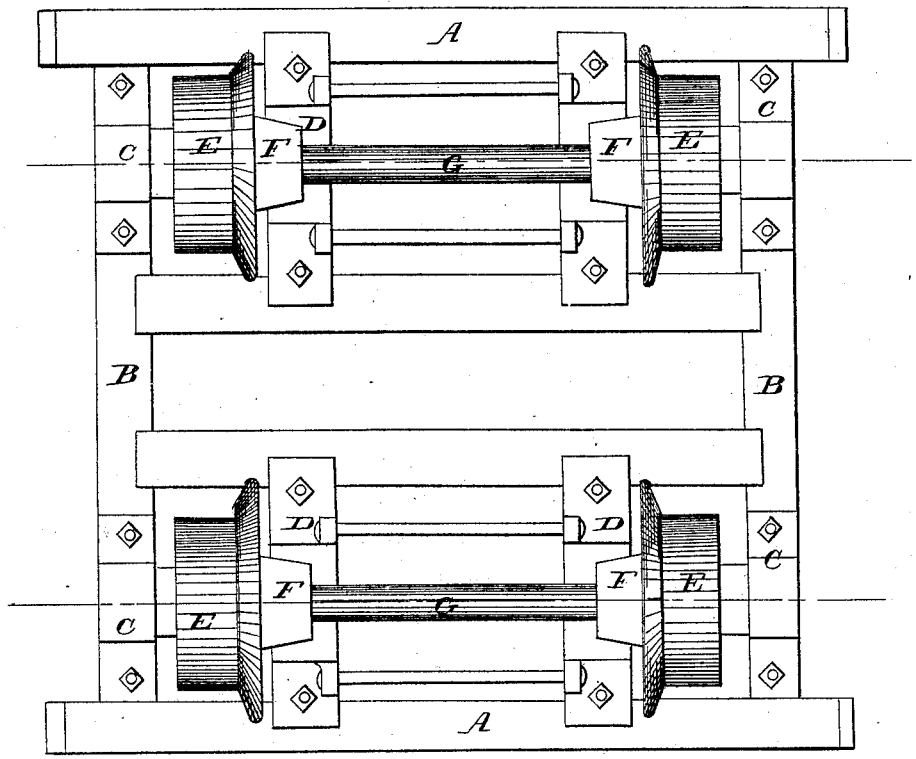
*Fig. 2.*
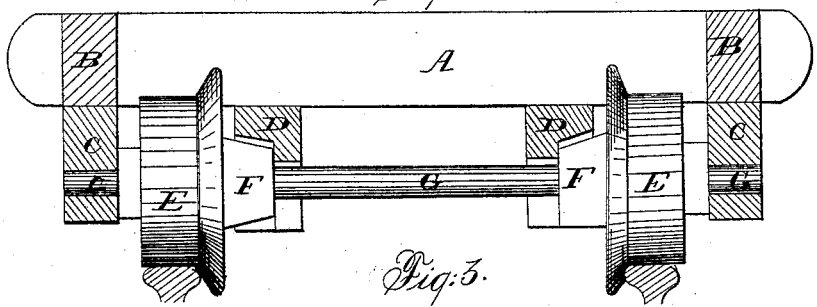
*Fig. 3.*
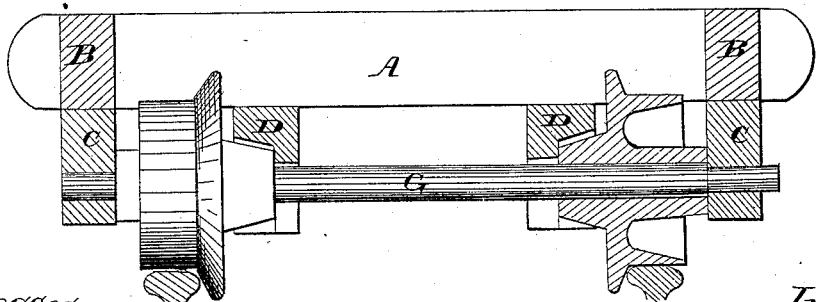
Witnesses　　　　　　　　　　　　　　　　　Inventor
C. A. Pettis　　　　　　　　　　　　　　　　D. James Happersett

UNITED STATES PATENT OFFICE.

D. JONES HAPPERSETT, OF COATESVILLE, PENNSYLVANIA.

IMPROVED CAR-TRUCK.

Specification forming part of Letters Patent No. 58,816, dated October 16, 1866.

*To all whom it may concern:*

Be it known that I, D. JONES HAPPERSETT, of Coatesville, in the county of Chester and State of Pennsylvania, have made a new and useful Improved Car-Truck; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a view of the under side of the truck. Fig. 2 is a transverse section through truck and pedestals, showing one axle broken inside of the wheel. Fig. 3 is a transverse section through truck, pedestals, and one wheel, the other wheel being in elevation, one axle being broken outside of the wheel.

The improvement consists in providing the car-truck with inside pedestals, so adjusted as to cap over the hubs of the wheels and the axles, so that in the event of the axle breaking at any time the wheels cannot leave the track. The inside pedestal does not form a bearing unless the axle breaks; and whether it breaks inside or outside the wheel, the position of the wheel is maintained by means of the hollow in the pedestal, which clasps and rests upon the hub.

In the drawings, A B are the timbers of the car-truck; C, the outside pedestals, containing the bearings of the axle G; and D, the inside pedestal, which has a hollow or cavity which incloses the hub F on the inside of the wheel, but is not in contact therewith when the parts are in normal running order.

If the axle G break on the inside of the wheel, as in Fig. 2, the pedestal forms a safeguard to catch the hub F and the end of the broken axle and prevent the wheel from running off the track.

If the axle G break outside the wheel, as in Fig. 3, the hub F of the wheel and the inner portion of the axle will be retained by the pedestal D, so as to avoid the danger of running off the track.

My improvement is intended as a safeguard in case of the breaking of the axle to catch and hold the wheel in an approximately proper position until the train can be stopped.

Having described my invention, what I claim as new, and desire to secure by Letters Patent, is—

The inner pedestal, D, attached to the bottom of the truck, and provided with a recess partially inclosing the upper portion of the hub on the inside of the wheel, so as to form a socket therefor in case of the breaking of the axle.

D. JONES HAPPERSETT.

Witnesses:
    A. G. FEATHER,
    EDWD. WORTH.